United States Patent [19]
Lownes et al.

[11] Patent Number: 6,137,539
[45] Date of Patent: Oct. 24, 2000

[54] DIGITAL TELEVISION STATUS DISPLAY

[75] Inventors: George Lownes, Morton, Pa.; Perry Dunn, Woodbury, N.J.; David Goodwin, Yardley, Pa.; Michael Kahn, West Ampton; Matthew Curreri, Medford, both of N.J.; Sergei Danilchuk, Horsham, Pa.

[73] Assignee: Matshushita Electric Industrial Co, LTD, Kadoma, Japan

[21] Appl. No.: 09/169,295

[22] Filed: Oct. 9, 1998

[51] Int. Cl.⁷ .............................. H04N 5/44; H04N 5/445
[52] U.S. Cl. ..................... 348/569; 348/385; 348/387; 348/7; 348/12; 348/13; 348/731
[58] Field of Search .................... 348/555, 556, 348/558, 460, 552, 563, 564, 569, 570, 731, 5, 9, 10, 7, 12, 13, 24, 8, 461, 385, 386, 387, 553; 455/6.2, 6.3, 4.2, 5.1; H04N 5/44, 5/445

[56] References Cited

U.S. PATENT DOCUMENTS

| | | | |
|---|---|---|---|
| 4,706,121 | 11/1987 | Young | 358/142 |
| 4,751,578 | 6/1988 | Reiter et al. | 358/183 |
| 4,847,696 | 7/1989 | Matsumoto et al. | 358/335 |
| 5,455,626 | 10/1995 | Xu | 348/385 |
| 5,481,297 | 1/1996 | Cash | 348/13 |
| 5,485,630 | 1/1996 | Lee et al. | 465/4.4 |
| 5,500,794 | 3/1996 | Fujita et al. | 364/185 |
| 5,570,131 | 10/1996 | Pires | 348/387 |
| 5,581,302 | 12/1996 | Ran et al. | 348/416 |
| 5,646,942 | 7/1997 | Olivier | 348/385 |
| 5,659,353 | 8/1997 | Krotreski | 348/387 |
| 5,758,259 | 5/1998 | Lawler | 348/12 |
| 5,790,177 | 8/1998 | Kassatly | 348/385 |
| 5,949,476 | 9/1999 | Pocock | 348/24 |
| 6,005,605 | 12/1999 | Kostreski | 348/387 |

FOREIGN PATENT DOCUMENTS

| | | |
|---|---|---|
| 0735776A2 | 10/1996 | European Pat. Off. . |
| 0751680A2 | 1/1997 | European Pat. Off. . |
| WO96/37999 | 11/1996 | WIPO . |

*Primary Examiner*—Mark R. Powell
*Assistant Examiner*—Wesner Sajous
*Attorney, Agent, or Firm*—Ratner & Prestia

[57] ABSTRACT

A television receiver which receives an ATSC multi-program stream for a single major channel and generates a status display which displays the major channel identifier and a plurality of indicators, each corresponding to a respective one of the minor channels associated with the major channel. The indicator corresponding to the minor channel that is currently selected is highlighted with respect to the other indicators. The television receiver includes an image format converter and the status display also includes information concerning the format of the received signal and any format conversion that is currently being performed. The television receiver is also coupled to a digital VCR via a digital communications link. The digital television receiver generates a control panel for the digital VCR on the display device of the television receiver, and includes a facility for receiving commands for the digital VCR, sending the commands to the digital VCR via the digital communications link displaying the current status of the digital VCR. The television receiver maintains the status display for the digital VCR, by sending a status change request to the digital VCR immediately after receiving any status change information, whereby the VCR responds to the status change request only on a subsequent change in its operational status.

4 Claims, 9 Drawing Sheets

DIGITAL TELEVISION STATUS DISPLAY

BACKGROUND OF THE INVENTION

The present invention relates generally to digital television receivers and in particular to a method for displaying status and controlling attached peripheral devices in television receivers that operate according to the digital television standard.

Current analog television systems transmit one program per channel. Selection from among the channels being broadcast at any given time is made by adjusting the tuner to tune to the frequency of the desired channel. In addition, peripheral devices, such as video cassette records (VCRs), which are connected to a television receiver are typically controlled exclusively through the VCR, even though a control or menu screen may be displayed on the display device of the television receiver.

Some digital television systems exist which transmit multiple programs via a satellite link. These systems include an electronic program guide which maps each program number into a particular transponder signal, a particular channel being transmitted by the transponder and a particular program in the channel. In these systems, the electronic program guide is required to tune to a program being carried by one of these digital satellite systems. Thus an electronic program guide must be generated at the head-end and decoded by the receiver in order to tune to a specific program.

The *Program and System Information Protocol for Terrestrial Broadcast and Cable* specification as described in publication DOC A/65 published by Advanced Television Systems Committee, which is incorporated herein by reference for its teachings on digital the program and system information protocol (PSIP), describes a method by which television program information may be transmitted with a multiprogram data stream that conveys multiple programs in a single terrestrial broadcast channel or cable channel. Thus, each of several broadcasters who transmit signals in a given area may send a signal that contains a single high-definition program or multiple programs which may be either high-definition or standard definition programs. When each broadcaster sends multiple programs over its channel, the standard describe a method by which these programs are identified. The PSIP standard builds upon the ATSC Digital Television Standard DOC A/53 which, in turn, builds upon the MPEG-2 standard defined by the Moving Picture Experts Group (MPEG) which is described in a publication entitled "Generic Coding of Moving Pictures and Associated Audio, Recommendation H.626", ISO/IEC 13818-2, IS, 11/94 available from the International Standards Organization and which is hereby incorporated by reference for its teaching on the MPEG-2 digital video coding standard.

The PSIP standard only defines a method for identifying and associating the various programs that are transmitted via an ATSC multi-program stream. It does not describe any method for displaying the data in a way that may be easily understood by a viewer.

SUMMARY OF THE INVENTION

The present invention is embodied in a television receiver which receives an ATSC multi-program stream for a single major channel and generates a status display which displays the major channel identifier and a plurality of indicators, each corresponding to a respective one of the minor channels associated with the major channel. The indicator corresponding to the minor channel that is currently selected is highlighted with respect to the other indicators.

According to one aspect of the invention, the television receiver includes an image format converter and the status display also includes information concerning the format of the received signal and any format conversion that is currently being performed.

According to another aspect of the invention, the television receiver is coupled to a digital VCR via a digital communications link. The digital television receiver generates a control panel for the digital VCR on the display device of the television receiver, and includes a facility for receiving commands for the digital VCR, sending the commands to the digital VCR via the digital communications link displaying the current status of the digital VCR.

According to yet another aspect of the invention, the television receiver generates a status display for the digital VCR, receives status information from the digital VCR when a change in status occurs and updates the status display to reflect the received changes in status.

DETAILED DESCRIPTION

Figure 1A:
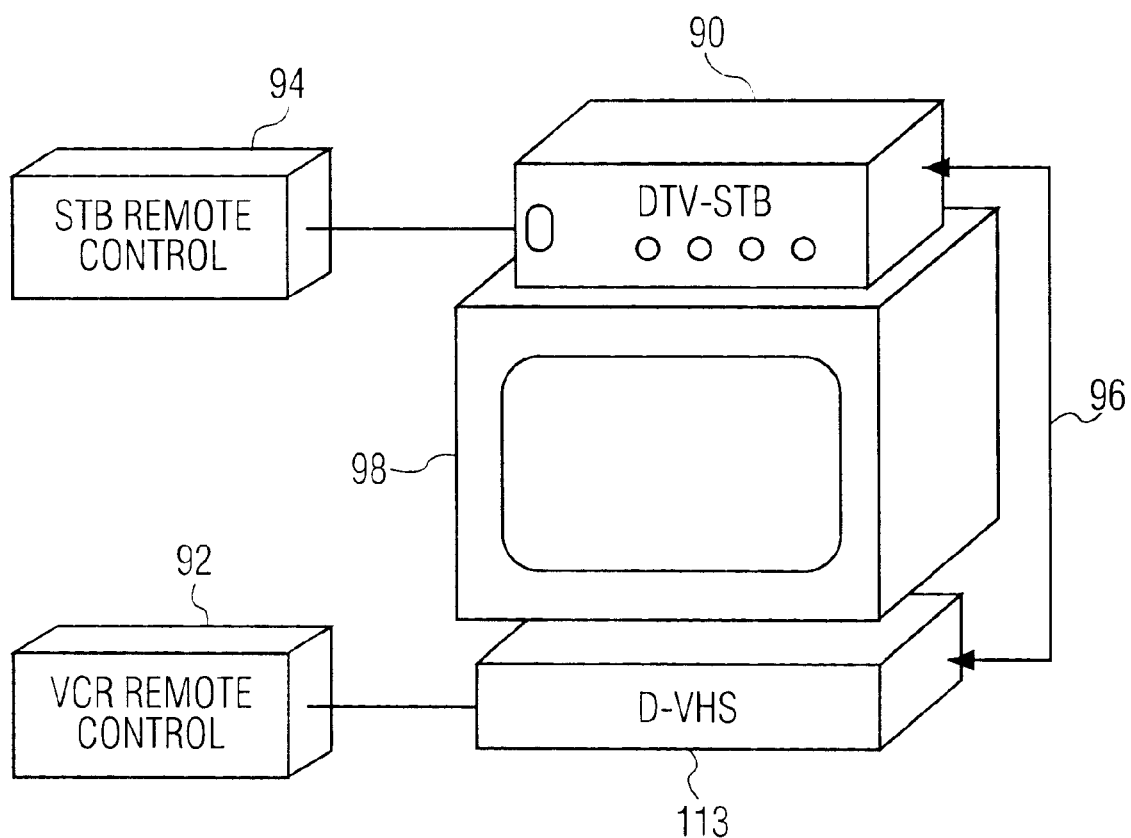
FIG. 1A is an isometric drawing, partly in block diagram form which illustrates a combination digital television set-top box, television display device and digital VCR.
Figure 1B:
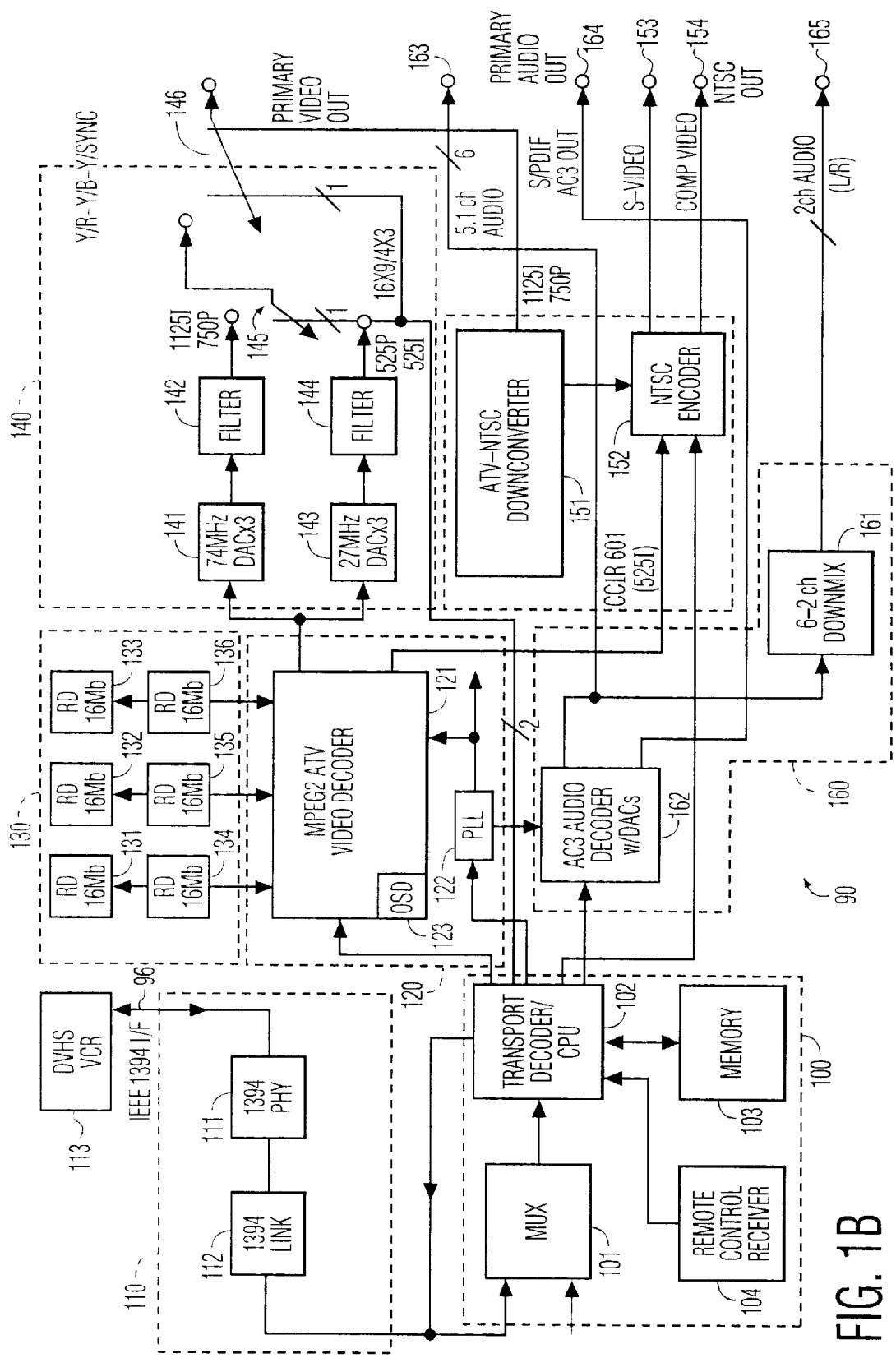
FIG. 1B is a block diagram of an exemplary digital television set-top box suitable for use in the combination shown in FIG. 1A.

FIG. 1A is a block diagram which illustrates an exemplary system configuration according to the present invention. In this system configuration, a digital television receiver 90, which, in the exemplary embodiment of the invention, is a set-top box (STB) is coupled to display video information on a video display device 98. The STB 90 is also coupled to provide an MPEG-2 transport stream to, and to receive the MPEG-2 transport stream from a digital VCR 113, which, in the exemplary embodiment of the invention, is a D-VHS device. The digital VCR 113 is coupled to the STB 90 via a digital communications channel 96, which, in the invention is an IEEE 1394 bus. As described below, the digital VCR 113 receives and provides digital television signals isosynchronously and receives commands and provides status information asynchronously over the channel 96. Also shown in FIG. 1B are two remote control devices, remote control device 94 is for the STB 90 and remote control device 92 is for the digital VCR 113.

The exemplary embodiments of the invention decode conventional HDTV signals which have been encoded according to the MPEG-2 standard and in particular, the Main Profile High Level (MP@HL) and the Main Profile Main Level (MP@ML) MPEG-2 standards, and provides the decoded signals as video signals having a selected one of multiple formats.

The MPEG-2 Main Profile standard defines a sequence of images in five levels: the sequence level, the group of pictures level, the picture level, the slice level, and the macroblock level. Each of these levels may be considered to be a record in a data stream, with the later-listed levels occurring as nested sub-levels in the earlier listed levels. The records for each level include a header section which contains data that is used in decoding its sub-records.

Each macroblock of the encoded HDTV signal contains six blocks and each block contains data representing 64 respective coefficient values of a discrete cosine transform (DCT) representation of 64 picture elements (pixels) in the HDTV image. In the encoding process, the pixel data may be subject to motion compensated differential coding prior to the discrete cosine transformation.

The blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

The video decoder of the present invention is designed to support a number of different picture formats, while requiring a minimum of decoding memory for down conversion of high resolution encoded picture formats, for example, 48 Mb RDRAM.

FIG. 1B shows an exemplary embodiment of the STB 90, coupled to the digital VCR 113 via the bus 96. The exemplary STB 90 receives and decodes encoded video information at MP@HL or at MP@ML, formatting the decoded information to a user selected output video format (which includes both video picture and audio information), and interfaces for providing the formatted video output signals to display devices. The exemplary embodiments of the present invention are designed to support all ATSC video formats. For simplicity, the operation is divided into a Down Conversion (DC) mode which receives any MPEG Main Profile video bit-stream (constrained by FCC standards) and provides a 480P, 480I or NTSC format picture, and a Full Specification (FS) mode which provides high resolution 1080I/1125I or 750P format picture from the MPEG Main Profile bit-stream.

The exemplary system of FIG. 1B includes a front end interface 100, a video decoder section 120 and associated Decoder Memory 130, a primary video output interface 140, an audio decoder section 160, a digital data interface 110, and an NTSC video processing section 150.

Referring to FIG. 1B, the front end interface 100 has a transport decoder and central processing unit (CPU) 102 with associated memory 103. Also included is a multiplexer 101 for selecting received control information and ATSC transport stream from, for example, a digital VHS video cassette recorder (DVHS VCR) 113 via the digital interface 110. In the exemplary embodiment of the invention, the interface 110 operates according to the IEEE 1394 link layer protocol. The IEEE 1394 bus is described in a technical standard *IEEE* 1394 *Standard for a High Performance Serial Bus* IEEE STD 1394–1995, Aug. 30, 1996. This bus includes an isosynchronous data transfer mode and an asynchronous data transfer mode. In the exemplary embodiment of the invention, bit-stream data is conveyed between the digital VCR 113 and the multiplexer 101 using a direct memory access (DMA) data transfer technique and command and status information are transferred between the digital VCR 113 and the CPU of the processor 102 via the asynchronous data transfer mode.

The other input port of the multiplexer 101 is coupled to receive an encoded transport stream from a digital television tuner (not shown). The transport decoder 102 converts the received transport packets containing compressed bit-stream data from the communication channel bit stream into compressed video data, which may be, for example, packetized elementary stream (PES) packets according to MPEG-2 standard. The transport decoder may provide either the PES packets directly to the video decoder section 120 and audio decoder section 160, or may further convert the PES packets into one or more elementary streams. Finally, the front-end interface 100 includes a remote control receiver which, for example, may receive infra-red (IR) commands from a remote control unit and provide these commands to the CPU of the transport decoder/CPU 102.

The video decoder section 120 includes an ATV Video Decoder 121 and digital phase locked loop (DPLL) 122. The ATV video Decoder 121 receives a reconstituted MPEG-2 bit-stream or video (PES) packets from the front end interface 100, and converts the packets into the elementary stream. A front end picture processor of the ATV Video Decoder 121 then decodes the elementary streams according to the encoding method used, to provide luminance and chrominance pixel information for each image picture.

The ATV Video Decoder 121 further includes a memory controller (not separately shown) to control decoding operations using an external memory 130 which provides image picture information and a display section to process decoded picture information into a desired picture format. The ATV Video Decoder 121 employs the Decoder Memory 130 for processing the high resolution encoded video signal, and the DPLL 122 is used to generate timing signals for synchronized processing operations between the ATV Decoder 120 and Decoder Memory 130. The Decoder Memory 130 includes a first group of memory units 131, 132 and 133 which may each be a 16 Mb RDRAM memory, and a second group of memory units 134, 135 and 136, which may also each be a 16 Mb RDRAM memory.

The primary video output interface 140 includes a first Digital to Analog converter (DAC) 141. The DAC 141 may include, for example, three DACs which process, respectively, the luminance signal Y and $C_R$ and $C_B$ chrominance signals. These DACs operate at 74 MHz, to produce an analog output signal for a filter 142. The filter operates to remove sampling artifacts from the analog signal provided by the DAC 141. This interface produces video signals having 1125I or 750P formats. The interface 140 also includes a second DAC 143. The DAC 143 also includes three DACs which convert, respectively the luminance signal and the $C_R$ and $C_B$ chrominance signals. These DACs, however, operate at 27 MHz to provide analog output signals for the filter 142. The output signal of the filter 142 is a video signal having a 480I or 480P format. The primary video output interface 140 converts the digitally encoded video signals having a desired format into analog video signals having chrominance and luminance components which correspond to the desired format.

The audio decoder section 160 includes an AC3 Audio decoder 162 which provides audio signals at output ports 163 and 164, and optional 6-2 channel down mixing processor 161 to provide 2 channel audio signals at output port 165. The audio processing of MP@HL MPEG-2 standard generates audio signal components from encoded digital information and provides the audio signal components via analog output at output ports 163, 164 and 165. Decoders of this type are well known in the art. An audio decoder suitable for use as the decoder 160 is a ST4600 AC3 decoder, available from the SGS Thomson.

In the exemplary embodiment of the invention, the digital data interface 110 is coupled to the DVHS VCR 113 to transmit and receive transport packets and control information using, for example, the IEEE 1394 data communications protocol. The interface 110 includes a physical layer processor 111 and link layer processor 112. The physical layer processor 111 and link layer processor 112 pass the transport packets containing the bit-stream between the DVHS VCR 113 and the video decoder section 120 and audio decoder section 160. The processors 111 and 112 may also convey transport packets containing control information between the DVHS VCR 113 and the CPU of the transport decoder/CPU 102.

The ATV video decoder 121 includes an on-screen display (OSD) processor 123 which may be used to generate control menus, to provide information on the status of the set-top box, or to provide closed caption information. The OSD processor 123 may include a character generator and a graphics generator. It may access a dedicated OSD area in the memory 130 to produce a bit-mapped display which overlays the video image produced at the primary video output port 146 and at the secondary video output ports 153 and 154.

The NTSC video processing section 150 includes an ATV-NTSC down conversion processor 151 which converts the analog HDTV signal provided by the filter 142 into a 480I signal. The NTSC encoder 152 receives a 480I analog signal and converts the signal to the NTSC formatted video signal at secondary video output ports 153 (S-video) and 154 (composite video).

Figure 1C:
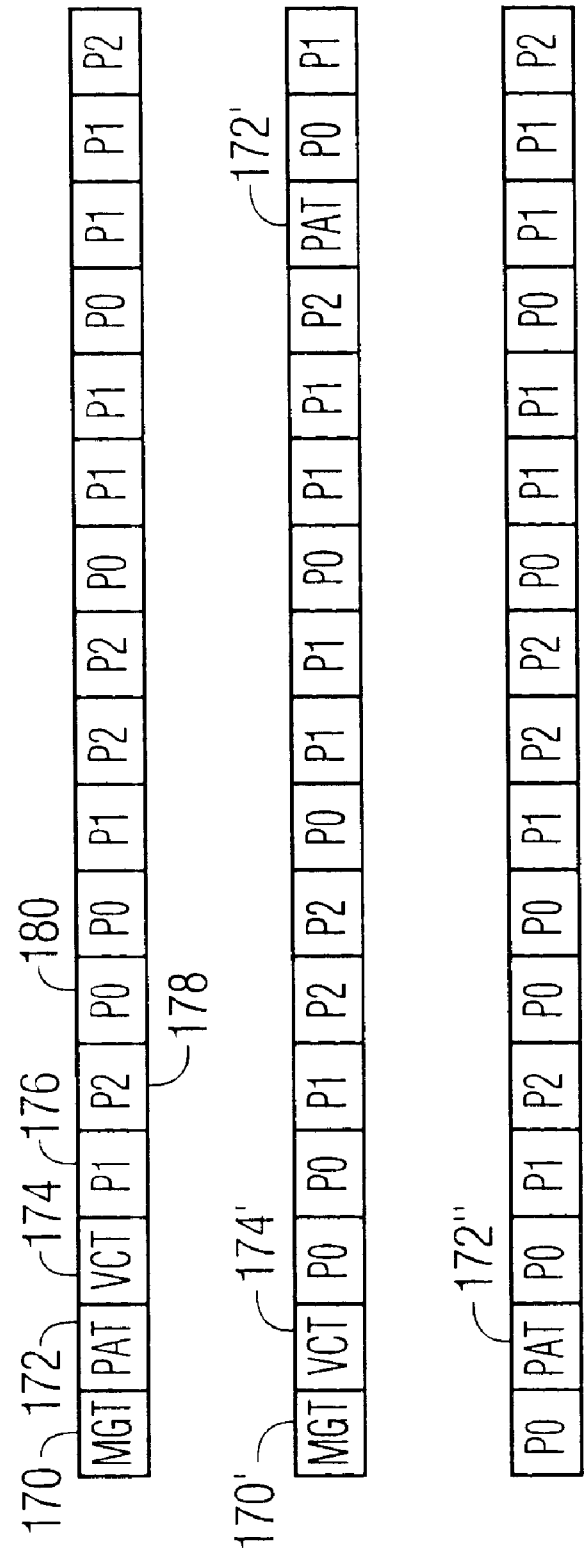
FIG. 1C is a transport stream diagram which is useful for describing the operation of the present invention.

FIG. 1C shows an exemplary multi-program transport stream which is provided by the multiplexer 101 to the transport decoder/CPU 102. The transport stream includes a transport packet which contains a Master Guide Table (MGT) 170 and Virtual Channel Table (VCT) according to the above-referenced PSIP protocol, a program association table (PAT) 172 and several transport packets for various program transport streams, P0, P1 and P2. Each of the blocks labeled P0 180, P1 176 and P2 178 may include multiple transport packets for the particular program transport stream. A typical transport stream may also include packets containing a program map tables (PMTs) and Conditional Access Tables (CAT), one for each program in the multi-program stream.

The transport decoder/CPU 102 extracts the VCT 174 and PAT 172 from the transport stream to determine the number and type of programs in the transport stream. The processor 102 also extracts the program map table for each program in the transport stream. This table associates the video, audio and data programs which are combined to produce a coordinated audio and video presentation. In the exemplary embodiment of the invention, the transport stream may also include data programs which are not associated with any audio or video programs.

In the exemplary embodiment of the invention, one of the video program streams and its associated audio and data program streams is selected from the multi-program stream to be decoded by the STB 90 and displayed on the display device 98. The present invention concerns a method by which status information regarding the received signal and the STB 90 is presented to the viewer.

As defined in the above-referenced PSIP specification, the MGT includes information on all of the events in the multi-program stream, where an event is defined in the PSIP specification as the combination of an associated audio, video and data program which are meant to be decoded and presented together. The MGT includes the packet identifier (PID) for the packets which contain the VCT. The PID of the VCT, however, is a fixed value of 0×1 FFB. Because the PID of the VCT is fixed, the decoder may readily find it in the bit-stream and does not need to reference the MGT. A sample VCT is shown below in Table 1.

TABLE 1

| Maj. Num. | Min. Num. | Short Name | Carrier Freq | Channel TS ID | Prog. Num. | Flags | Service Type | Source ID | Desc. |
|---|---|---|---|---|---|---|---|---|---|
| 10 | 0 | WCAU-D0 | 604 | 0 × AA1 | 0 × FF0 | | digital | 20 | ch__name |
| 10 | 1 | WCAU-D1 | 604 | 0 × AA1 | 0 × FF1 | | digital | 21 | ch__name |
| 10 | 2 | WCAU-D2 | 604 | 0 × AA1 | 0 × FF2 | | digital | 20 | ch__name |
| 10 | 3 | WCAU-D3 | 604 | 0 × AA1 | 0 × FF3 | | digital | 20 | ch__name |
| 10 | 4 | WCAU-D4 | 604 | 0 × AA1 | 0 × FF4 | | digital | 22 | ch__name |

The Major Channel Number may be the analog broadcast channel number by which a broadcaster is known in the community. The number of the analog channel is maintained as the Major Channel Number even though the actual digital signal may be transmitted at a different frequency. The Minor Channel Number indicates a number of a particular event stream in the multi-program stream. While the numbers are shown as 0 to 4 in the above example, they may be any 10-bit integer. The Short Name is the name of the virtual channel. This name may have up to seven alphanumeric characters. The frequency is the transmission frequency on which the digital multi-program stream is transmitted. The Channel Transport Stream ID is a 16-bit value which identifies the MPEG-2 transport stream that carries the multi-program stream. The Program Number is a 16-bit value which associates the program with a PAT and PMT. The service type indicates that all of the channels in the VCT are digital channels. Although it is not shown in Table 1, the VCT may also accommodate the analog channel which is used by the broadcaster of the digital channel. The Source ID identifies the provider of the program and the descriptor field may contain descriptors which point to other information for the channel. In this instance, the descriptor field for each of the five minor channels points to the full name of the channel.

Information from VCT, the sequence header for the bit-stream and internal register values that are maintained by the CPU of the processor 102 are all used by the STB status display. This status display is shown when the RECALL button (not shown) is pressed on the STB remote control 94. The RECALL button is typically used in television receivers to cause the current status of the receiver to be displayed for a short time. On a conventional television receiver, this status display may include the channel number, time and a short name for the station. For an analog television signal, the short name may be transmitted as encoded information during the vertical blanking interval.

Figure 2:
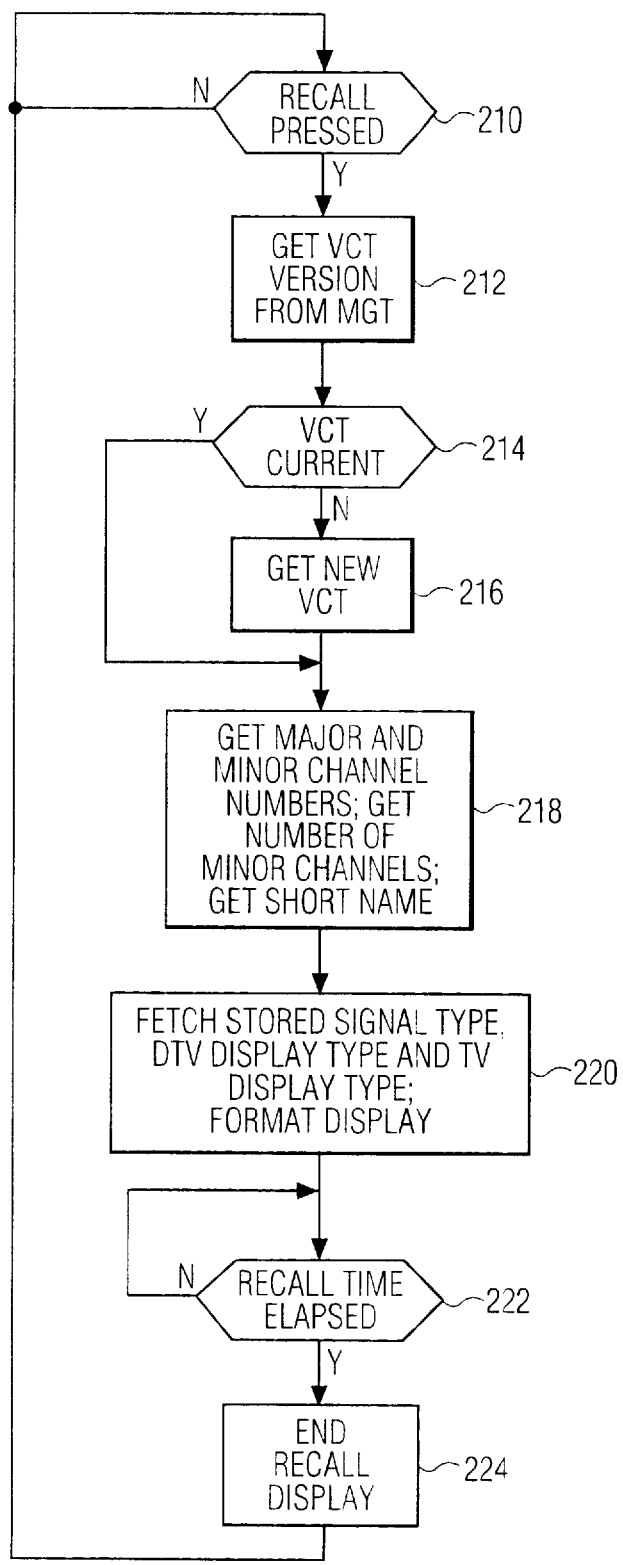
FIG. 2 is a flow-chart diagram which illustrates the data gathering steps for the digital television status display.

FIG. 2 is a flow-chart diagram which illustrates a method by which the status information may be extracted from the multi-program stream. At step 210, the viewer presses the RECALL button to view the status display. At step 212, the process obtains the next VCT in the bit-stream. According to the ACTV standard, the number of programs transmitted in a multi-program stream may change to accommodate different data rates. For example, a broadcast multi-program stream may convey one MP@HL program or five MP@ML programs. As the content of the multi-program stream changes, the VCT is updated to reflect these changes. To allow digital television receivers to adapt to changes in the multi-program stream, the next VCT may be sent in the transport stream before it is valid. A flag is set in the VCT to indicate that it reflects the current state of the multi-program transport stream.

Step 214 compares the flag in the retrieved VCT to ensure that it is valid. If the flag is not set, step 216 monitors the transport stream for the PID of the and extracts the current VCT from the transport stream. If the stored VCT is current at step 214 or after a new VCT has been obtained at step 216, step 218 extracts the major and minor channel numbers and the short name for the minor channel which is currently being decoded. Step 218 also counts the number of minor channels in the current transport stream and determines the index of the currently decoded minor channel among the minor channels in the multi-program stream. At step 220, the process obtains the vertical size and aspect ratio information from the sequence header data which has been previously obtained and stored by the processor 102.

If the vertical size and aspect ratio information are not consistent with the display device 98, then the process determines if any conversion is being performed to display the received signal on the display device. For a display device having a 16 by 9 aspect ratio, a 16 by 9 image may be displayed full screen while a 4 by 3 image may be converted by: 1) zooming the image to fit the width of the display, thereby removing the top and bottom portions of the image; 2) Expanding, where the image is expanded horizontally to fit the screen, this may be done by holding the center of the image constant and expanding only the side panels or by expanding the entire image; or by displaying the 4 by 3 image with side-bars on the 16 by 9 display. A display device having a 4 by 3 aspect ratio may display a fall-screen 4 by 3 image and may convert a 16 by 9 image by: 1) zooming the image to fit the height of the display, thereby removing the side portions; 2) shrinking the image horizontally either across the entire image or just at the side panels; or 3) displaying the 16 by 6 image in a letter-box mode with a background color being displayed above and below the 16 by 9 image to fill out the 4 by 3 screen.

Also at step 220, the information obtained at steps 218 and 220 is formatted into a status display and provided to the display device 98. At step 222, the process waits until the RECALL time (typically a few seconds) has elapsed and then, at step 224 ceases to provide the status display to the display device 98. After step 224, the process branches back to step 210 to wait until the RECALL is pressed again. Although the process of FIG. 2 is shown as an endless loop, it is contemplated that it may be implemented as a vectored interrupt process which is invoked by the CPU 102 when the RECALL button is pressed. In this implementation, the display may also be activated any time there is a change in any of the status information.

Figure 3A:
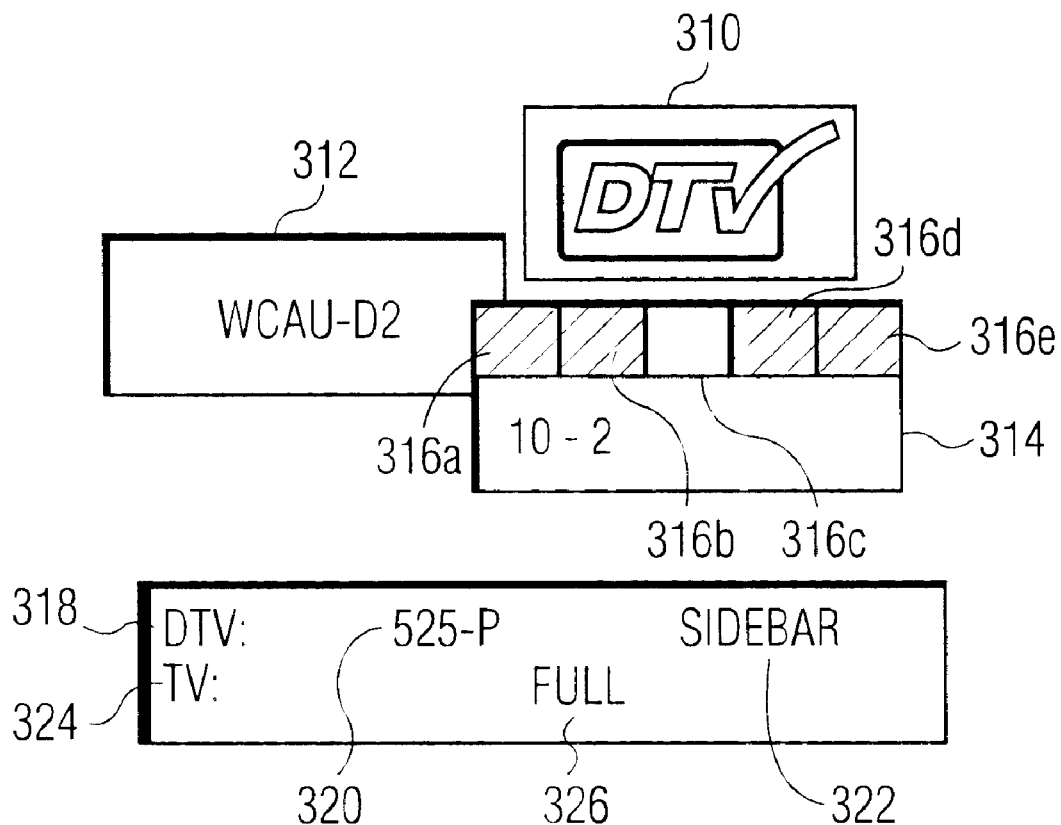
FIG. 3A is a graphic depiction of an exemplary digital television status display.

FIG. 3A is a graphic depiction of the STB status display. This display includes a symbol 310 indicating that a digital television program is being decoded, an indication, 310 of the major and minor channel numbers, in this instance, 10 and 2, respectively, and a graphic illustration of the number of minor channels 316a through 316e being transmitted through the major channel with the current minor channel 316c highlighted. The display also includes the short name 312 of the current minor channel, in this instance, WCAU-D2. Finally, the status display includes indications of the format being used to display the received signal at the primary and secondary output ports. The format at the primary output port, 318, indicates that the signal is a 480 P signal 520 which is displayed on the 16 by 9 monitor with sidebars 322. The format of the secondary output port, 324, indicates that the 480 P image occupies the full screen of the 4 by 3 monitor.

Figure 3B:
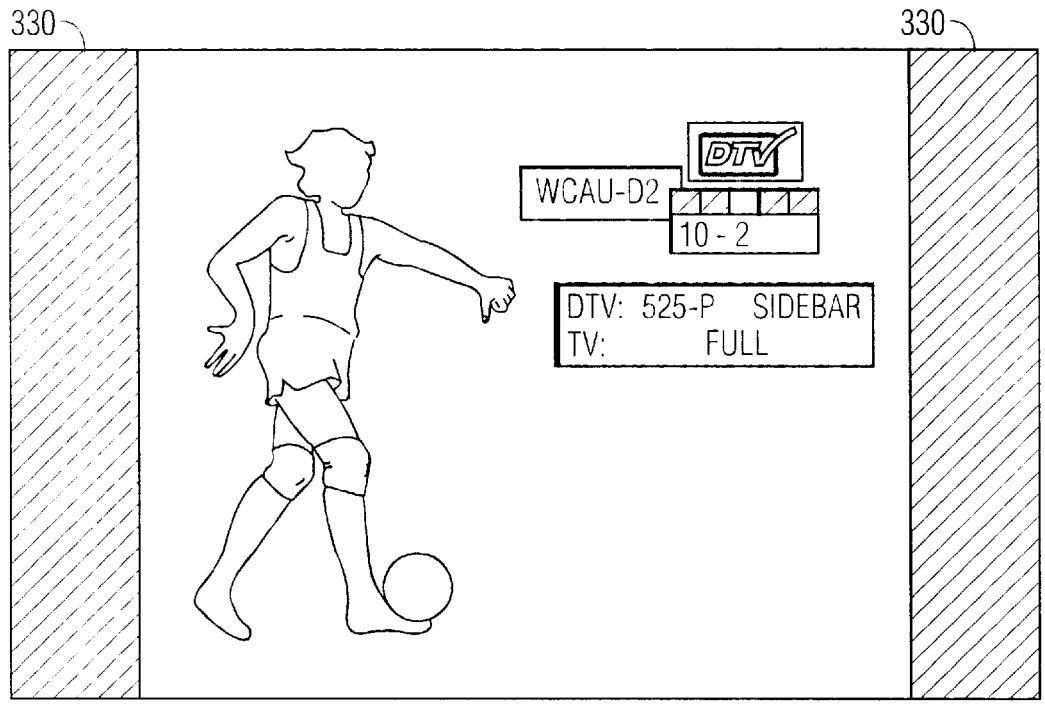
FIGS. 3B through 3E are television image diagrams which are useful for describing the operation of the digital television status display.
Figure 3C:
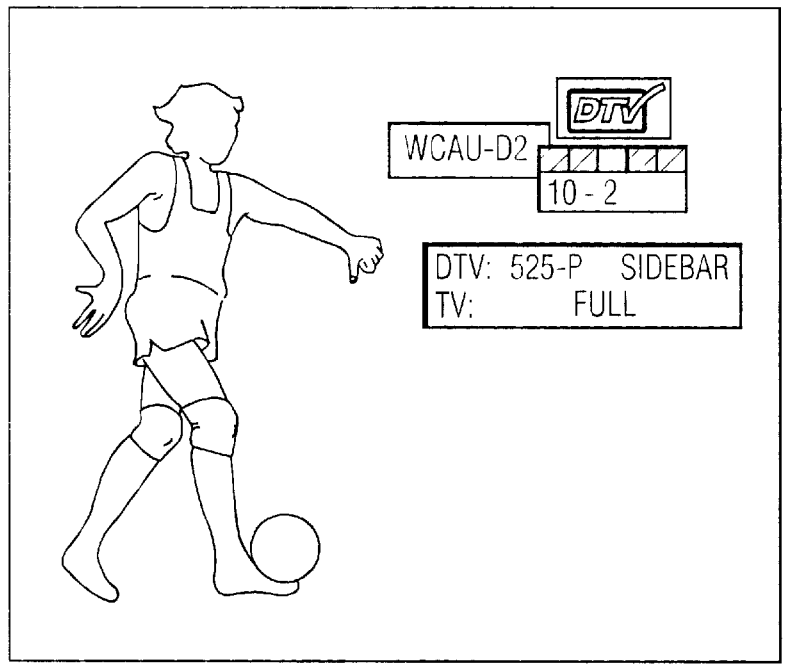

FIGS. 3B and 3C illustrate an exemplary image which may have the status display shown in FIG. 3A, as displayed on a 16 by 9 monitor coupled to the primary output port 146 (shown in FIG. 1B) and on a 4 by 3 monitor coupled to the secondary output port 153, 154 (also shown in FIG. 1B). FIG. 3B shows the in sidebars 330 on the 16 by 9 monitor.

Figure 3D:
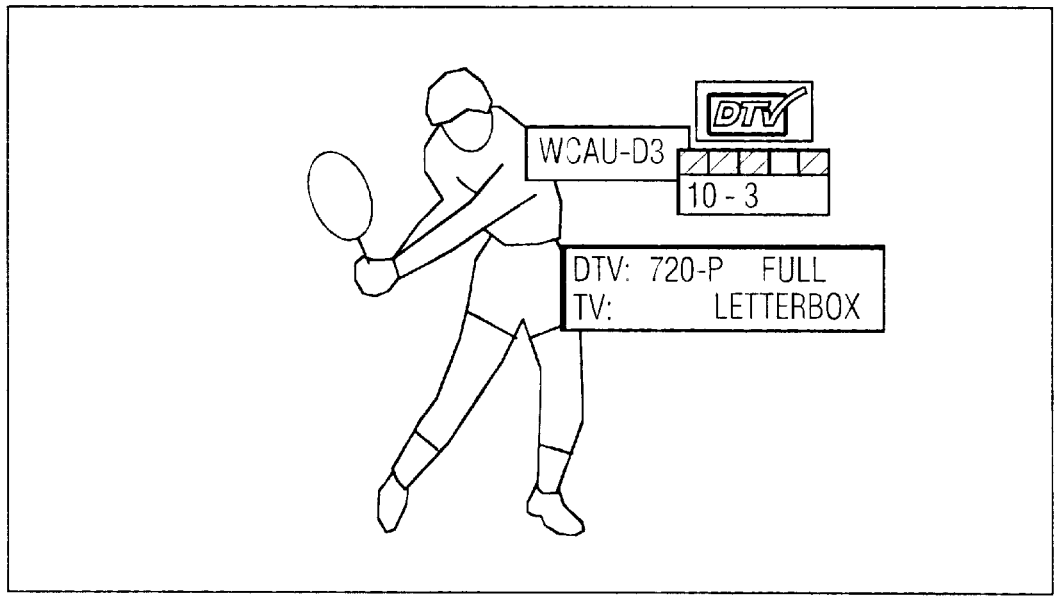
Figure 3E:
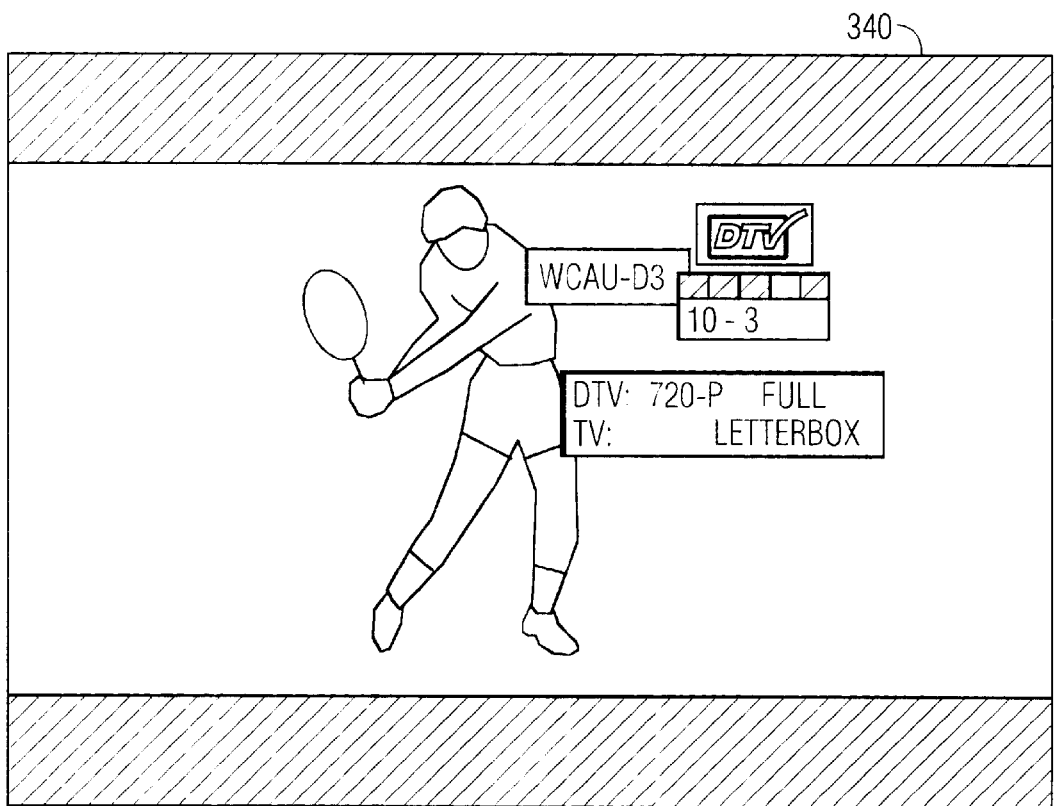

FIGS. 3D and 3E illustrate an exemplary image which may have the which may be obtained by advancing to the next minor program, program 3, in the multi-program stream. This image is a 16 by 9 720 P image. It is noted that the status display is updated to show the new minor program number as well as the short name for the new program. In addition, the display parameters are changed to show that the 720 P image is displayed in full-screen mode on the 16 by 9 monitor and in letterbox mode on the 4 by 3 monitor. FIG. 4E shows the blanked top and bottom portions 430 of the display when the 16 by 9 image is displayed in letterbox format.

As described above, the set-top box 90 is coupled to a digital VCR 113 via an IEEE 1394 serial bus 96 to transfer a transport stream from the VCR 113 to the STB 90 to be decoded and displayed. In addition, the STB 90 may control the operation of the VCR 113 through the serial bus 96. As described above, the IEEE 1394 bus employs two methods of data transfer: isosynchronous and asynchronous. In the exemplary embodiment of the invention, the isosynchronous mode is used to transfer the transport stream from the digital VCR 113 to STB 90. This mode may employ, for example, a direct memory access protocol to transfer data between a first buffer memory in the VCR 113 to a second buffer memory, for example, in the 1394 link layer device 112 (shown in FIG. 1B). To perform the actual data transfer, the physical layer device 111 and a similar physical layer device (not shown) in the VCR 113, may partition and encapsulate the data stream according to a physical data transfer protocol.

Figure 4:
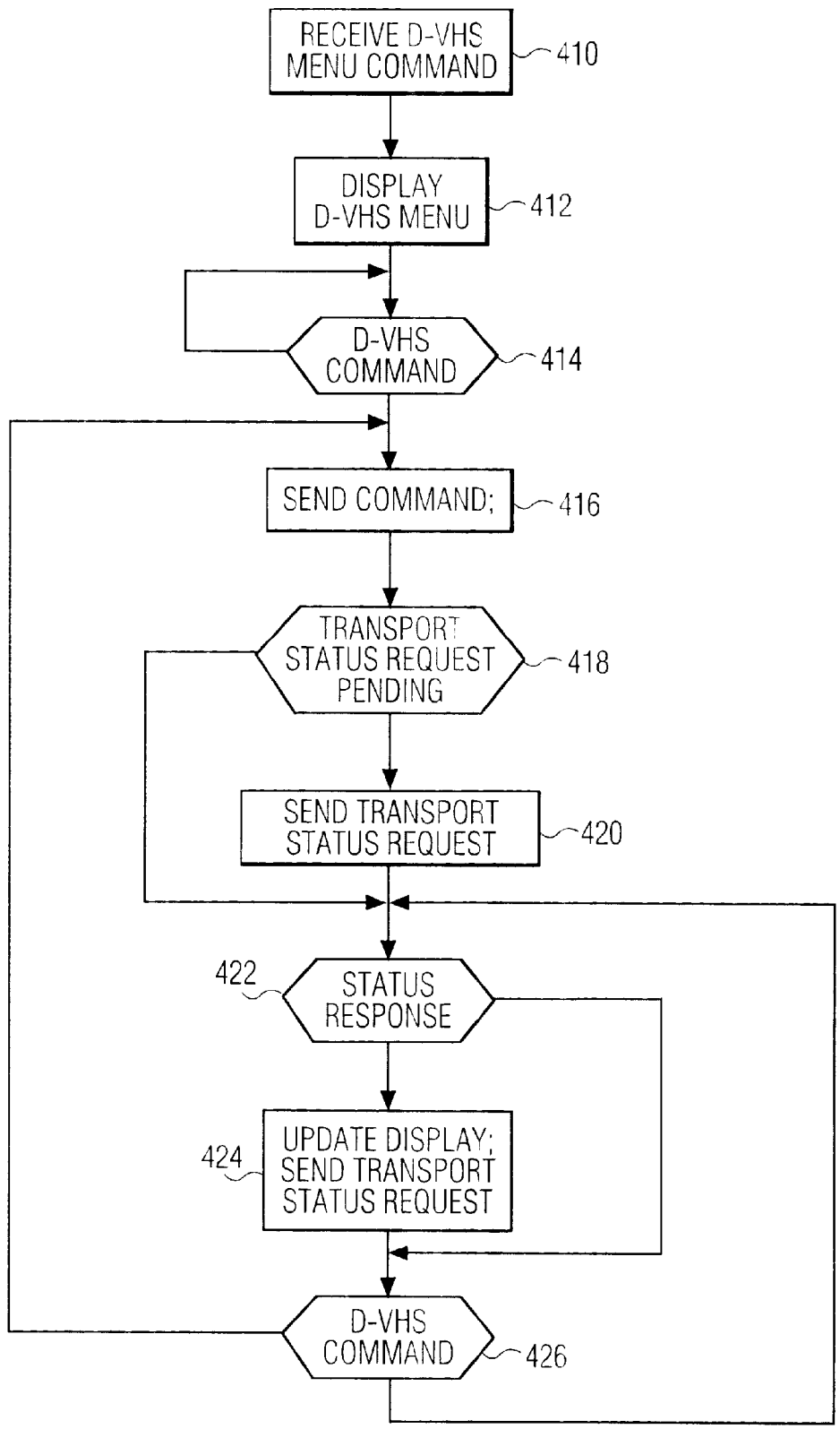
FIG. 4 is a flow-chart diagram of a digital VCR control and status display process according to the present invention.

The control of the digital VCR 113 from the STB 90 is complicated by the ability to separately control the VCR via its front panel controls (not shown) or via the VCR remote control 92. FIG. 4 is a flow-chart diagram which illustrates one method by which the VCR 113 may be controlled from the STB 90. In the first step in this process, step 410, the STB 90 receives a command to activate the command menu for the digital VCR 113. At step 412, in response to this command, the STB 90 causes a control menu for the VCR 113 to be displayed on the display device 98. Next, step 414 waits until the viewer enters a command for the digital VCR 113. At step 416, the command is interpreted and sent to the VCR 113 via the bus 96. At step 418, the process determines if a pending transport status request exists for the VCR 113. As described below, the STB 90 uses these transport status requests to determine the current state of the digital VCR 113. If the state of the VCR changes due to internal operation or due to the viewer entering a command via the front panel or the remote control 92, the pending transport status request will cause the VCR 113 to report the status change to the STB 90.

At step 418, if a status request is already pending then the VCR 113 will report any status change caused by the command that was issued in step 416. Consequently, if a status request is pending at step 418, control transfers to step 422 to wait for the response. If no status request is pending at step 418, then, at step 420 the process sends a status request to the digital VCR 113. At step 422, the process waits for a response from the pending status request indicating that a change in the state of the VCR 113 has occurred. At step 424, the process retrieves the status change information from status response and updates the display. Also at step 424, the process sends a new transport status request to the digital VCR 113 to ensure that the STB maintains the current status of the VCR 113. At step 426, the process determines if a new VCR command has been entered through the VCR control panel on the STB 90. If so, control branches to step 416, described above. Otherwise, the process loops until a status response is received from the digital VCR 113.

While FIG. 4 shows the STB VCR control as a single non-terminating process, it is contemplated that it may be implemented as two separate vectored interrupt processes. In this instance, the first process may include steps 410 through 420, which is invoked when a user enters a VCR command from the STB 90 while the second process may include step 424 which is invoked when a status response is received from the VCR 113.

Figure 5:
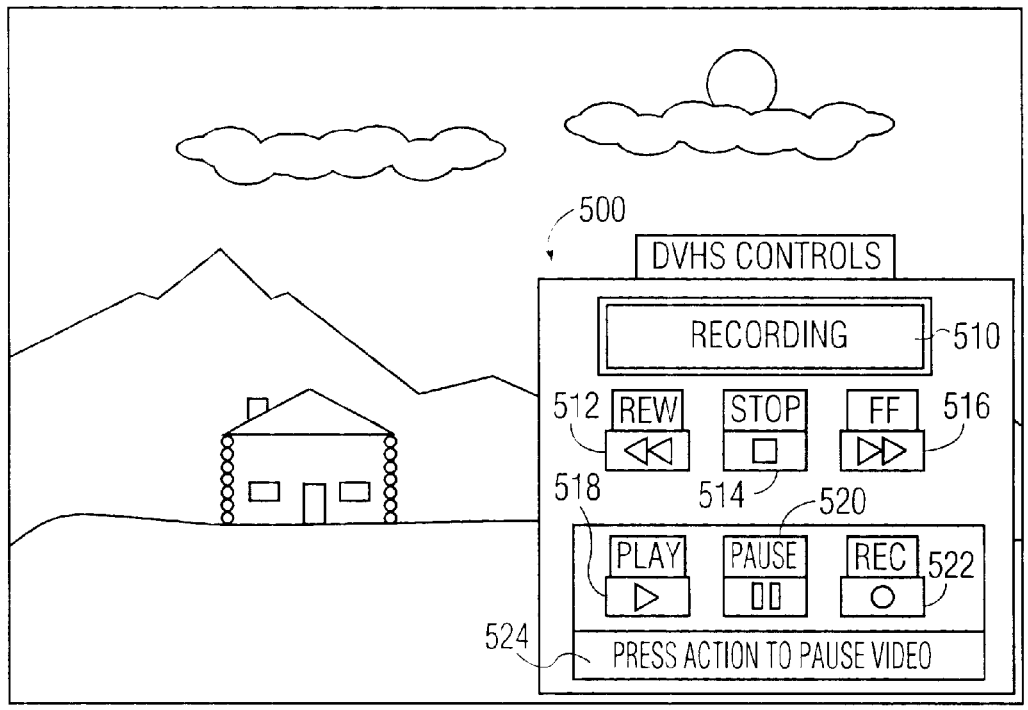
FIG. 5 is a television image diagram which illustrates the digital VCR control menu of FIG. 4.

In the exemplary embodiment of the invention, the VCR control panel for the STB may be implemented as shown in FIG. 5. The control panel 500 includes a status window 510 and control buttons for rewind, 512; stop, 514; fast forward, 516; play, 518; pause, 520; and record, 532. The user selects a button on the VCR control menu using, for example, the arrow keys on the STB remote control 94 and then engages the button by pressing the ACTION key (not shown). When a button is selected, it is highlighted with respect to the other buttons. In FIG. 5, the pause button 520 is highlighted. An instruction window 524 is also provided in the exemplary embodiment of the invention to inform the viewer of steps that may be taken, in this instance, the pause key may be engaged by pressing the ACTION key on the STB remote control 94.

As shown in FIG. 5, when the VCR control menu 500 is displayed the current status of the digital VCR 113 is shown in the status window 510. When the control menu is not displayed, it may still be desirable to notify the viewer when the VCR 113 has changed state. In the exemplary embodiment of the invention, this is accomplished via a VCR status display 600 shown in FIG. 6. The status display 600 includes a display element 610 which identifies the information as pertaining to the digital VHS VCR, a window 612 having the same contents as the window 510 shown in FIG. 5, and a time window 614, which may, for example, display the current time index of the video tape.

The control display shown in FIG. 5 blocks a relatively large portion of the screen. Although not shown, the digital television receiver 90 may also display a minimized menu. This menu may be activated by advancing the menu of the VCR control panel until a minimize "button" (not shown) is selected. When this button is activated, the control display shown in FIG. 5 becomes a linear display at the bottom of the screen containing only the symbols in the buttons 512, 514, 516, 518, 520 and 522.

Figure 6:
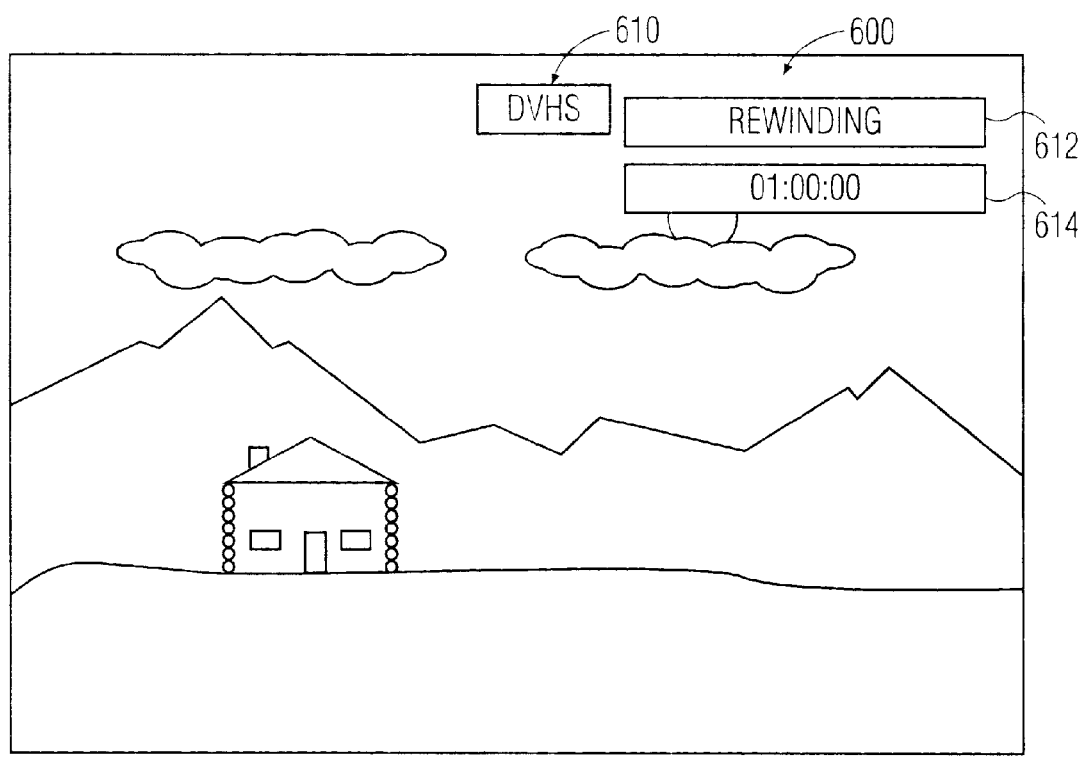
FIG. 6 is a television image diagram which illustrates the digital VCR status display of FIG. 4.

FIGS. 5 and 6 are useful for describing the operation of the STB 90 in controlling the digital VCR 113. In FIG. 5, the viewer has brought up the control menu and, in a previous step, has engaged the record button to cause the digital VCR to record the existing program. After receiving a response at step 422 indicating that the VCR is recording, the STB issues a new status request command at step 424. Some time later, the viewer has deactivated the VCR control menu and the VCR, while recording, has encountered the end of the tape. In this instance, the VCR immediately changes state to rewind the tape. This status change is sent to the STB in response to the pending transport status request. The response is received at step 422 and the viewer is informed of the status change via the display 600 shown in FIG. 6.

While the invention has been described in terms of an exemplary embodiment, it is contemplated that it may be practiced within the scope of the appended claims.

What is claimed is:

1. A method for displaying the status of a digital television receiver which receives an Advanced Television Systems Committee (ATSC) multi-program stream comprising the steps of:

displaying an identifier for a major channel transmitted in the ATSC multi-program stream;

displaying a plurality of indicators, each of the indicators corresponding to a respectively different one of a plurality of minor channels within the major channel for a single major channel; and highlighting one of the minor channel indicators to indicate that video information in the respective minor channel is being decoded and displayed.

2. A status display method according to claim 1, wherein the digital television receiver includes an image format converter which converts images generated from the one minor channel to a format compatible with a display device that may be coupled to the television receiver, the method further comprising the step of displaying information concerning the format of the received signal and any format conversion that is currently being performed.

3. Apparatus for displaying the status of a digital television receiver which receives an Advanced Television Systems Committee (ATSC) multi-program stream comprising:

means for displaying an identifier for a major channel transmitted in the ATSC multi-program stream;

means for displaying a plurality of indicators, each of the indicators corresponding to a respectively different one of a plurality of minor channels within the major channel for a single major channel; and means for highlighting one of the minor channel indicators to indicate that video information in the respective minor channel is being decoded and displayed.

4. A status display apparatus according to claim 3, wherein the digital television receiver includes an image format converter which converts images generated from the one minor channel to a format compatible with a display device that may be coupled to the television receiver, the apparatus further comprising means for displaying information concerning the format of the received signal and any format conversion that is currently being performed.

* * * * *